Figure 1:
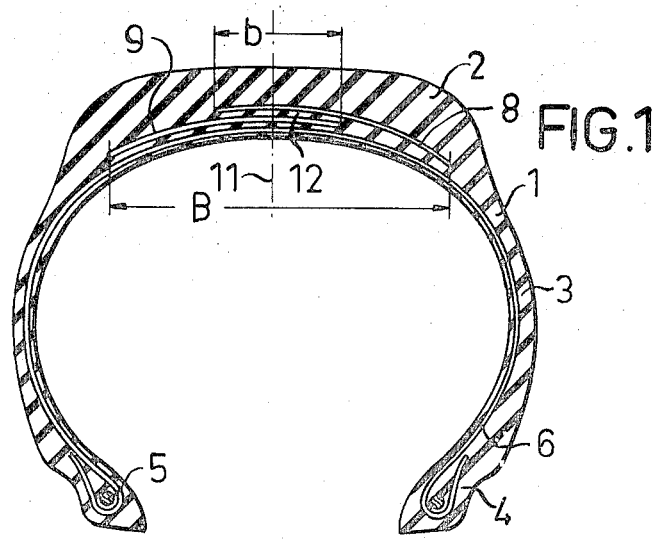

United States Patent

[11] 3,550,666

[72] Inventors Hans Menell
Ahlem, Hannover;
Hermann Henning, Hannover, Germany
[21] Appl. No. 735,227
[22] Filed June 7, 1968
[45] Patented Dec. 29, 1970
[73] Assignee Continental Gummi-Werke Aktiengesellschaft
Hannover, Germany

[54] PNEUMATIC VEHICLE TIRE
5 Claims, 3 Drawing Figs.
[52] U.S. Cl. ................................................. 152/354, 152/361
[51] Int. Cl. ................................................... B60c 5/08, B60c 9/06, B60c 13/00
[50] Field of Search ..................................... 152/354, 361

[56] References Cited
UNITED STATES PATENTS
2,984,282  5/1961  Vittorelli ....................... 152/361
3,327,753  6/1967  Travers ......................... 152/356

Primary Examiner—Drayton E. Hoffman
Attorney—Walter Becker

ABSTRACT: A pneumatic vehicle tire with first and second strength members in overlapping arrangement with each other and located radially inwardly of the tire tread strip, and with third strength members leading from bead to bead and while passing through the tire sidewalls and radially inwardly of the overlapping area of said first and second strength members extending substantially at a right angle with regard to the tire circumferential plane of symmetry, said first and second strength members respectively defining acute but inverse angles with said plane of symmetry whereas those sections of said third strength members which are located between said area of overlapping and the tire shoulders have an inclination opposite to the inclination of the respective adjacent portions of said first and second strength members.

PNEUMATIC VEHICLE TIRE

The present invention concerns a pneumatic vehicle tire with threads, cords, wires or the like extending from bead to bead and passing through the tire sidewalls at a right angle or approximately right angle with regard to the tire circumferential direction, and with an annular reinforcing insert which extends substantially over the width of the tread strip and is composed of cord fabric layers which when viewed in the transverse direction of the tire are located adjacent to each other, the threads, cords, wires or the like of said cord fabric extending at an incline with regard to the tire circumferential direction in such a way that the threads, cords, wires or the like of one layer extend in one inclined direction whereas those of the other layer extend in the opposite inclined direction.

With heretofore-known pneumatic tires as disclosed, for instance, in German Pat. No. 1,198,691, the two adjacent cord fabric layers are associated with a cord fabric layer, the threads, cords, wires or the like extend transversely to the tire circumferential direction. These transversely extending threads, cords, wires or the like in the tread strip zone of the tire are intended to keep the increase in the width of the tire within admissible limits, which is necessary with this type of tire because the further layers in the tire zenith portion are, when viewed in the transverse direction of the tire, located adjacent to each other.

It is an object of the present invention to provide a pneumatic vehicle tire which will prevent the increase in width and circumference of the tire in the tire strip zone.

It is another object of this invention to provide a pneumatic vehicle tire as set forth in the preceding paragraph which will improve the driving properties of the tire.

Figure 2:
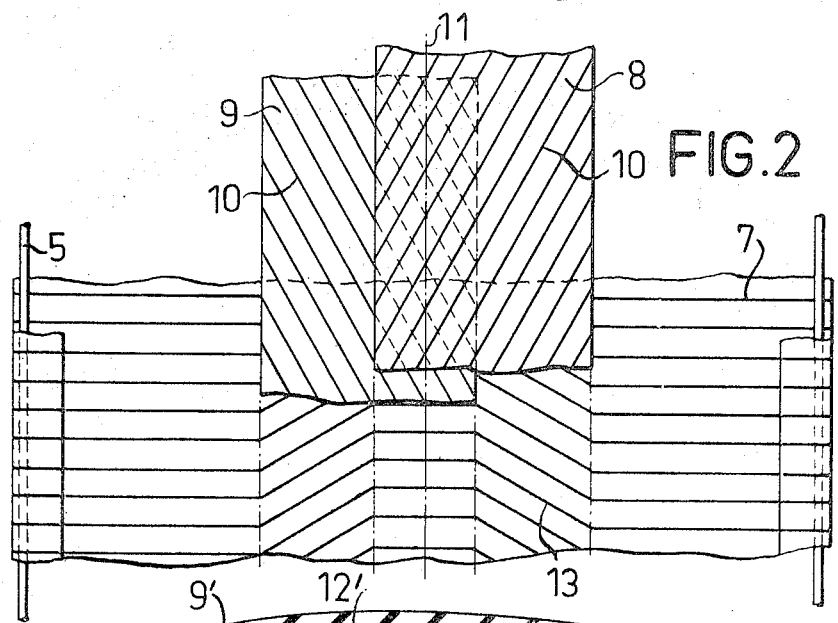
Figure 3:
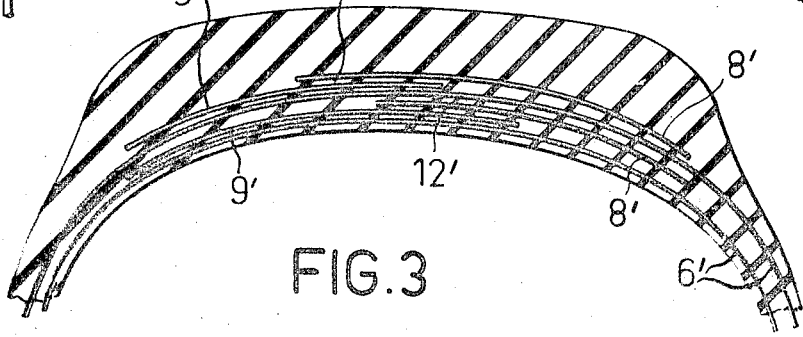

These and other objects and advantages of the invention will appear more clearly from the following specification in connection with the accompanying drawing, in which:

FIG. 1 illustrates a radial partial section through a pneumatic vehicle tire according to the invention;

FIG. 2 shows the arming of the tire according to FIG. 1 which, for reasons of simpler illustration is shown as being located in the drawing plane and in top view; and FIG. 3 diagrammatically illustrates a radial partial section through a pneumatic vehicle tire according to the invention the arming of which within the area of the tread strip zone is somewhat modified over that in the tire according to FIG. 1.

The tire according to the present invention is characterized primarily in that the two cord fabric layers overlap each other and that the threads, wires, cords or the like which lead to the beads extend in the overlapping area at a right angle or practically a right angle with regard to the tire circumferential direction, whereas the sections of the threads, cords, wires or the like which are anchored to the beads and are located at both sides of the overlapping area extend along an incline which is opposite to that of the threads, cords, wires or the like pertaining to the adjacent cord fabric layer.

With a tire of this construction, in which the overlapping area of the cord fabric layer is preferably arranged centrally below the tread strip, the overlapping cord fabric layers bring about an additional reinforcement. Moreover, the said overlapping cord fabric layers result in a relatively high strength of the tire body in transverse direction in view of the fact that the threads, cords, wires or the like the ends of which are anchored in the tire beads while the threads are located below the overlapping area, extend at least an approximately right angle with regard to the tire circumferential direction. At both sides of the overlapping area there is arranged a cross section which is formed by the cord fabric layers and the threads, cords, wires or the like anchored to the tire beads.

Referring now to the drawing in detail, the tire body 1 which consists primarily of rubber or the like, comprises a tread strip 2, sidewalls 3 and bead cores 5 respectively located in the beads 4. The tire furthermore comprises thread-shaped reinforcing inserts which are vulcanized in and are substantially parallel to each other. These reinforcing inserts may be designed as pull-resistant threads, cables, bands or the like, and may be called "strength members."

The arming consists in particular of three layers, viz. a layer 6 with threads 7 or the like extending from bead to bead in an uninterrupted manner and anchored in the tire beads 4 by being looped around the bead cores 5.

Within the area of the tread strip 2, between the latter and the layer 6 there are provided two cord fabric layers 8 and 9 which consist of pull-resistant threads 10 and in which cord fabric layers 8 and 9 extend at an incline at an angle of from 5°—30 with regard to the tire circumferential direction. Within the area of the center line 1, the two cord fabric layers 8, 9 overlap each other. The overlapping area 13 has a width which corresponds approximately to from 10 percent to 30 percent of width B approximately equaling the tread strip B. Preferably, the width $b$ amounts to about 25 percent of the total width B. The inclined angle of the threads 10 is so selected that for the two cord fabric layers 8 and 9 an opposite inclined ascent is obtained while forming a cross connection at the overlapping area 12.

The threads 7 extend in the tire sidewalls 3 practically at a right angle with regard to the tire circumferential direction. Below the two laterally outwardly located marginal portions of the two cord fabric layers 8, 9 the threads are angled off while forming sections 13 of the threads which extend in opposite direction with regard to the superimposed sections of the threads 10. The thread angles of the thread sections 13 are furthermore greater than the angles of the threads 10 thereabove. The said thread angles amount to approximately 30° to 45°. Below the overlapping area 12, the threads 7 extend again in a transverse direction. Thus, the threads 7, for all practical purposes extend at a right angle to the tire circumferential direction.

As will be seen from the drawings, in view of the above arrangements, at the overlapping area 12, viewed over the width $b$, a cross connection is obtained with additionally transversely extending thread sections, whereas at both sides of the overlapping area 12, merely a cross connection is provided. As a result thereof, a desirable stiffening of the tire body 1 precisely below the center of the tread strip 2 is obtained. Thus, during the running of the tire, disadvantageous bead forms are prevented. A nearly uniform wear over the entire width of the tread strip is realized. Additionally, precisely within the area of the largest diameter of the tire body 1, care has to be taken that an increase in the width of the tire will be prevented.

In addition thereto, the arming below the tread strip 2 is so selected that in view of the cooperation of the cord fabric layers 8, 9 and of those sections of the thread 7 which are adjacent to said cord fabric layers 8, 9, a belt-shaped reinforcement is obtained which extends over the entire circumference of the tire and brings about a sufficiently good lateral stabilization of the tire.

When subjected to higher stresses, the tire can be reinforced by additional layers in which instance, however, care is to be taken that with the further layers 6 or cord fabric layers 8 and 9 the threads 7 and 10 thereof extend parallel to those threads of the adjacent layer which are associated with said threads 7, 10. Thus, with reference to FIG. 3, two layers 8' and 9' are provided. The course of the threads corresponds to that of FIG. 2 with the difference that all here illustrated threads are doubled. However, with the here-provided doubling of the layer, a mutual offsetting of the overlapping area 12' is provided. One overlapping area 12' is located, to a major extent, more on one side of the central line 11 of the tire, whereas the other overlapping area is located more on the other side of the central line 11 of the tire. In this way, a still wider cross connection is obtained with additional reinforcement by those sections of thread 7 which extend at a right angle with regard to the circumferential direction of the tire. Furthermore, also an overlapping of the two overlapping areas 12' is obtained, as is clearly shown in FIG. 3.

It is, of course, understood that with additional arming layers, a corresponding offset of the overlapping areas 12 may be effected.

The pneumatic tire described above has the additional advantage that it can be produced in conformity with the flat band method. The layers 6 may, for building up the hollow cylindrical raw tire be formed of threads which are stretched out and extend at a right angle with regard to the circumferential direction of the raw tire. The course of the thread will then be obtained by a mutual influencing of the layers 6, 8 and 9 during the curving operation or the pressing of the tire in the vulcanizing mold.

It may also be mentioned that in view of the overlapping areas, it is possible to obtain an almost cylindrical tread strip zone which, with a correspondingly shaped tread surface, brings about a minimum wear of the tire.

If, in conformity with FIG. 3 two layers 6' and two cord fabric layer pairs 8', 9' are employed, the sequence of the layers is in conformity with FIG. 1 effected in steps. Above a cord fabric layer pair 8', 9' having associated therewith a layer 6' facing the hollow chamber of the tire, there is provided a further layer 6' over which again the cord fabric 8', 9' is arranged. The tire reinforcement according to FIG. 3 thus consists, so to speak, of two superimposed arm portions in conformity with FIG. 1 while the overlapping areas 12' are offset with regard to each other.

It is, of course, to be understood, that the present invention is, by no means, limited to the particular arrangement shown in the drawing, but also comprises any modifications within the scope of the appended claims.

We claim:

1. A pneumatic vehicle tire having a tread strip with tire shoulders on opposite sides of said tread strip, and also comprising beads, which includes: a first layer of strength members arranged radially inwardly of said tread strip and extending from an area on one side of the central radial plane of symmetry of the tire to the area of one tire shoulder on the other side of said plane of symmetry, a second layer of strength members arranged radially inwardly of said tread strip and partially radially inwardly of the strength members of said first layer while extending from an area on said other side of said plane of symmetry to the area of the other tire shoulder so that said first and second layers overlap each other radially inwardly of said tread strip while their strength members are inclined in inverse manner with regard to each other but at substantially the same angle with regard to said plane of symmetry, and a third layer of strength members located radially inwardly of said first and second layers and having its strength members extend from bead to bead while passing through the sidewalls of the tire and the area of overlapping of said first and second strength members at an at least nearly 90° angle with regard to said plane of symmetry, those sections of the strength members of said third layer which are located between said shoulders and the area in which said first and second layers overlap extending at an angle of inclination with regard to said plane of symmetry which is opposite to the angle of inclination of the respective adjacent strength members of said other two layers, the tire comprising a plurality of pairs of overlapping first and second layers of strength members, and in which the area of overlapping of the strength members respectively pertaining to a first and second layer of each pair is asymmetric with regard to said plane of symmetry.

2. A vehicle tire according to claim 1, in which the area of overlapping of said first and second layers of strength members is located radially inwardly of the central portion of said tread strip.

3. A vehicle tire according to claim 1, in which the area of overlapping of said first and second layers of strength members has a width equaling from 10 percent to 30 percent of the distance between the outermost lateral edges of said first and second layers.

4. A vehicle tire according to claim 1, in which the tire includes at least one pair of first layers of strength members and at least one pair of second layers of strength members and also includes at least one pair of third layers of strength members, and in which one layer of said pair of third layers has a portion thereof adjacent one first layer whereas another layer of said pair of third layers is located adjacent another first layer and the respective adjacent second layer.

5. A pneumatic vehicle tire having a tread strip with tire shoulders on opposite sides of said tread strip, and also comprising beads, which includes: a first layer of strength members arranged radially inwardly of said tread strip and extending from an area on one side of the central radial plane of symmetry of the tire to the area of one tire shoulder on the other side of said plane of symmetry, a second layer of strength members arranged radially inwardly of said tread strip and partially radially inwardly of the strength members of said first layer while extending from an are on said other side of said plane of symmetry to the area of the other tire shoulder so that said first and second layers overlap each other radially inwardly of said tread strip while their strength members are inclined in inverse manner with regard to each other but at substantially the same angle with regard to said plane of symmetry, and a third layer of strength members located radially inwardly of said first and second layers and having its strength members extend from bead to bead while passing through the sidewalls of the tire and the area of overlapping of said first and second strength members at an at least nearly 90° angle with regard to said plane of symmetry, those sections of the strength members of said third layer which are located between said shoulders and the area in which said first and second layers overlap extending at an angle of inclination with regard to said plane of symmetry which is opposite to the angle of inclination of the respective adjacent strength members of said other two layers, the area of overlapping of said first and second layers of strength members having a width equaling about 25 percent of the distance between the outermost lateral edges of said first and second layers, the area of overlapping of a first layer of a pair of first and second layers with a second layer of the same pair being laterally offset with regard to the area of overlapping of another first and second layer of an adjacent pair of first and second layers.